(12) United States Patent
Gordon et al.

(10) Patent No.: US 9,507,513 B2
(45) Date of Patent: Nov. 29, 2016

(54) DISPLACED DOUBLE TAP GESTURE

(75) Inventors: David R. Gordon, Shibuya-ku (JP);
Ram Brijesh Jagadeesan, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 404 days.

(21) Appl. No.: 13/588,493

(22) Filed: Aug. 17, 2012

(65) Prior Publication Data
US 2015/0186026 A1   Jul. 2, 2015

(51) Int. Cl.
*G06F 3/048*   (2013.01)
*G06F 3/0488*  (2013.01)
*G06F 3/041*   (2006.01)
*G06F 3/01*    (2006.01)
*G06F 3/0484*  (2013.01)

(52) U.S. Cl.
CPC .......... *G06F 3/04883* (2013.01); *G06F 3/016* (2013.01); *G06F 3/017* (2013.01); *G06F 3/041* (2013.01); *G06F 3/0412* (2013.01); *G06F 3/0416* (2013.01); *G06F 3/0484* (2013.01); *G06F 3/0488* (2013.01); *G06F 2203/04104* (2013.01); *G06F 2203/04806* (2013.01)

(58) Field of Classification Search
CPC ...... G06F 3/041; G06F 3/017; G06F 3/0488; G06F 3/0416; G06F 3/0412; G06F 3/016; G06F 3/0484
USPC ................. 715/788, 863; 345/173
See application file for complete search history.

(56) References Cited

U.S. PATENT DOCUMENTS

| | | | |
|---|---|---|---|
| 5,544,295 A | 8/1996 | Capps | |
| 5,809,267 A | 9/1998 | Moran et al. | |
| 5,825,352 A | 10/1998 | Bisset et al. | |
| 5,864,635 A | 1/1999 | Zetts et al. | |
| 6,958,749 B1 | 10/2005 | Matsushita et al. | |
| 7,479,949 B2 | 1/2009 | Jobs et al. | |
| 7,643,006 B2 | 1/2010 | Hill et al. | |
| 7,812,826 B2 | 10/2010 | Ording et al. | |
| 7,941,439 B1 | 5/2011 | Lawrence et al. | |
| 8,468,469 B1 * | 6/2013 | Mendis et al. | 715/863 |

(Continued)

FOREIGN PATENT DOCUMENTS

EP   2 000 894 A2   12/2008

OTHER PUBLICATIONS

Audible Sight, "Gestures & Onscreen Keyboard," (2011). Retrieved from the Internet on Aug. 31, 2012: URL:http://audiblesight.com/?page_id=108.

(Continued)

*Primary Examiner* — William Bashore
*Assistant Examiner* — James F Sugent
(74) *Attorney, Agent, or Firm* — Marshall, Gerstein & Borun LLP

(57) ABSTRACT

On a computing device having a motion sensor interface, a first tap a first point is detected via the motion sensor interface. A second tap is detected via the motion sensor interface at a second point within a fixed time interval of detecting the first tap. In response to determining that the second point is inside a fixed radius of the first point, the first tap and the second tap are processed as an instance of a first gesture. Otherwise, in response to determining that the second point is outside the fixed radius of the first point, the first tap and the second tap are processed as an instance of a second gesture.

17 Claims, 5 Drawing Sheets

(56) References Cited

U.S. PATENT DOCUMENTS

| | | |
|---|---|---|
| 2002/0036618 A1 | 3/2002 | Wakai et al. |
| 2005/0210418 A1 | 9/2005 | Marvit et al. |
| 2006/0026521 A1 | 2/2006 | Hotelling et al. |
| 2006/0026536 A1 | 2/2006 | Hotelling et al. |
| 2006/0055662 A1 | 3/2006 | Rimas-Ribikauskas et al. |
| 2006/0242650 A1 | 10/2006 | Tsunedomi et al. |
| 2006/0267951 A1 | 11/2006 | Rainisto |
| 2006/0288313 A1* | 12/2006 | Hillis .......................... 715/863 |
| 2007/0262964 A1 | 11/2007 | Zotov et al. |
| 2008/0036743 A1 | 2/2008 | Westerman et al. |
| 2008/0165255 A1 | 7/2008 | Christie et al. |
| 2008/0174570 A1 | 7/2008 | Jobs et al. |
| 2008/0211783 A1 | 9/2008 | Hotelling et al. |
| 2008/0297484 A1 | 12/2008 | Park et al. |
| 2008/0309632 A1 | 12/2008 | Westerman et al. |
| 2009/0046110 A1* | 2/2009 | Sadler et al. ................ 345/660 |
| 2009/0051671 A1 | 2/2009 | Konstas |
| 2009/0100383 A1 | 4/2009 | Sunday et al. |
| 2009/0128516 A1 | 5/2009 | Rimon et al. |
| 2009/0178007 A1* | 7/2009 | Matas .................. G06F 3/0482 715/835 |
| 2009/0199130 A1 | 8/2009 | Tsern et al. |
| 2009/0267903 A1 | 10/2009 | Cady et al. |
| 2009/0273571 A1* | 11/2009 | Bowens ............. G06F 3/03547 345/173 |
| 2009/0284478 A1 | 11/2009 | De la Torre Baltierra et al. |
| 2009/0327974 A1 | 12/2009 | Abanami et al. |
| 2010/0011027 A1 | 1/2010 | Cox et al. |
| 2010/0020025 A1 | 1/2010 | LeMort et al. |
| 2010/0031186 A1* | 2/2010 | Tseng et al. .................. 715/786 |
| 2010/0045666 A1 | 2/2010 | Kornmann et al. |
| 2010/0045667 A1 | 2/2010 | Kornmann et al. |
| 2010/0045703 A1 | 2/2010 | Kornmann et al. |
| 2010/0050133 A1 | 2/2010 | Nishihara et al. |
| 2010/0053094 A1 | 3/2010 | Kong et al. |
| 2010/0053110 A1 | 3/2010 | Carpenter et al. |
| 2010/0053219 A1 | 3/2010 | Kornmann |
| 2010/0083190 A1 | 4/2010 | Roberts et al. |
| 2010/0097342 A1 | 4/2010 | Simmons et al. |
| 2010/0134425 A1 | 6/2010 | Storrusten |
| 2010/0162181 A1 | 6/2010 | Shiplacoff et al. |
| 2010/0164891 A1 | 7/2010 | Hill et al. |
| 2010/0177051 A1 | 7/2010 | Bilow |
| 2010/0235118 A1 | 9/2010 | Moore et al. |
| 2010/0235729 A1 | 9/2010 | Kocienda et al. |
| 2010/0241973 A1 | 9/2010 | Whiddett |
| 2010/0259493 A1 | 10/2010 | Chang et al. |
| 2010/0280988 A1 | 11/2010 | Underkoffler et al. |
| 2010/0283742 A1 | 11/2010 | Lam |
| 2010/0287513 A1 | 11/2010 | Singh et al. |
| 2010/0321319 A1 | 12/2010 | Hefti |
| 2011/0007000 A1 | 1/2011 | Lim |
| 2011/0032194 A1 | 2/2011 | Lai |
| 2011/0043472 A1 | 2/2011 | Hada |
| 2011/0050629 A1 | 3/2011 | Homma et al. |
| 2011/0074828 A1 | 3/2011 | Capela et al. |
| 2011/0078624 A1 | 3/2011 | Missig et al. |
| 2011/0084893 A1* | 4/2011 | Lee et al. ........................ 345/6 |
| 2011/0102464 A1 | 5/2011 | Godavari |
| 2011/0126094 A1 | 5/2011 | Horodezky et al. |
| 2011/0179387 A1 | 7/2011 | Shaffer et al. |
| 2011/0181526 A1 | 7/2011 | Shaffer et al. |
| 2011/0191719 A1 | 8/2011 | Hinckley et al. |
| 2011/0209098 A1 | 8/2011 | Hinckley et al. |
| 2011/0221666 A1 | 9/2011 | Newton et al. |
| 2012/0056818 A1 | 3/2012 | Shafi et al. |
| 2012/0110517 A1 | 5/2012 | Sparks et al. |
| 2012/0192115 A1* | 7/2012 | Falchuk et al. ............... 715/850 |
| 2012/0303268 A1* | 11/2012 | Su ..................... G01C 21/3632 701/428 |

OTHER PUBLICATIONS

Binh et al., "Real-Time Hand Tracking and Gesture Recognition System," GVIP '05 Conference, pp. 362-368, Cairo, Egypt (2005).
Boring et al., "The Fat Thumb: Using the Thumb's Contact Size for Single-Handed Mobile Interaction," *MobileHCT* (2012).
Buxton, "31.1: Invited Paper: A Touching Story: A Personal Perspective on the History of Touch Interfaces Past and Future," Society for Information Display (SID) Symposium Digest of Technical Papers, 41(1):444-448 (2010).
Buxton, "Case Study 1: Touch Tablets," Haptic Input, Chapter 5 (2009).
Buxton, "Gesture Based Interaction," Haptic Input, Chapter 14 (2009).
Buxton, "Taxonomies of Input," Haptic Input, Chapter 4 (2009).
Calpe et al., "AD7879 Controller Enables Gesture Recognition on Resistive Touch Screens," Analog Dialogue (2011).
CommandFusion Wiki, "Gestures," (2010).
de Freitas et al., "Recognition, Tracking and Association of Hands, Fingers, and Blobs: A Tbeta Upgrade," Google Summer of Code, Project Proposal (2009).
de Nardi, "Grafiti: Gesture Recognition Management Framwork for Interative Tabletop Interfaces," Università di Pisa (2008).
Echtler et al., "Features, Regions, Gestures: Components of a Generic Gesture Recognition Engine," Paper presented at a workshop of the ACM SIGCHI Symposium on Engineering Interactive Computing Systems, Berlin, Germany (2010).
FITC Design & Technology Events, "Lessons Learned: Adventures in Multitouch," (2010). Retrieved from the Internet on Sep. 28, 2011: URL:http://www.fitc.ca/news?p=726.
Fried, "Microsoft to Add Multitouch Intergace to Windows 7," CNET News (2008). Retrieved from the Internet on Sep. 26, 2011: URL:http://news.cnet.com/8301-13860_3-9953243-56.html.
Garafa "GPS Kit—iPhone * iPad User Guide," (2011).
Get Satisfaction, "Rotating Photos in iPhone with Touchscreen," (2011). Retrieved from the Internet on Sep. 27, 2011: URL:http://getsatisfaction.com/apple/topics/rotating_photos_in_iphone_with_touchscreen.
Hinckley et al., "38.2: Direct Display Interaction via Simultaneous Pen + Multi-Touch Input," Society for Information Display (SID) Symposium Digest of Technical Papers, 41(1):537-540 (2010).
Hubpages, "Window 7 Touch Screen—Windows Photo Gallery—Touchscreen—Best Windows Image Gallery 65," (2011). Retrieved from the Internet on Sep. 27, 2011: URL:<http://aperturering.hubpages.com/hub/Windows-7-Touch-Screen-Windows-Photo-Gallery.
Karlson et al., "ThumbSpace: Generalized One-Handed Input for Touchscreen-Based Mobile Devices," Interact (2007).
Macworld, "Avoid iPhone Navigation and Typing Hassles," (1994-2012). Retrieved from the Internet on Aug. 31, 2012: URL:http://www.macworld.com/article/1131264/tco_iphone.html.
Matsushita et al., "Dual Touch: A Two-Handed Interface for Pen-Based PDAs," CHI Letters, 2(2):211-212 (2000).
MSDN, "Designing for Direct Manipulation," (2012). Retrieved from the Internet on Aug. 31, 2012: URL:http://msdn.microsoft.com/en-us/library/ms698539(v=vs.85).aspx.
Multiplans.net, Latest News: Mar. 23, 2011: Version 1.32 (2011).
Nui Group, "Multi-Touch Technologies," 1st Ed. (2009).
Oka et al., "Real-Time Tracking of Multiple Fingertips and Gesture Recognition for Augmented Desk Interface Systems," Proceedings of the Fifth IEEE International Conference on Automatic Face and Gesture Recognition (2002).
Olwal et al., "Rubbing and Tapping for Precise and Rapid Selection on Touch-Screen Displays," Proceedings of CHI, Conference on Human Factors in Computing Systems (2008).
PQLabs, "PQLabs Multi-Touch Platform Configuration Reference," (2009).
SitePen, "Touching and Gesturing on iPhone, Android, and More," (2012). Retrieved from the Internet on Aug. 31, 2012: URL:http://www.sitepen.com/blog/2011/12/07/touching-and-gesturing-on-iphone-android-and-more/.
Sitepen, "Touching and Gesturing on the iPhone," (2008). Retrieved from the Internet on Sep. 28, 2011: URL:http://www.sitepen.com/

(56) References Cited

OTHER PUBLICATIONS blog/2008/07/10/touching-and-gesturing-on-the-iphone.
SonyMobile, "Android One Finger Zoom Tutorial—Part 1," (2012). Retrieved from the Internet on Aug. 31, 2012: URL:http://blogs.sonymobile.com/wp/2010/05/18/android-one-finger-zoom-tutorial-part-1/.
Stackoverflow, "DoubleTap in Android," (2012). Retrieved from the Internet on Aug. 31, 2012: URL:http://stackoverflow.com/questions/4804798/doubletap-in-android.
Stackoverflow, "Interpret "Double Tap" from TouchLocation Stream using Rx," (2012). Retrieved from the Internet on Aug. 31, 2012: URL:http://stackoverflow.com/questions/6714786/interpret-double-tap-from-touchlocation-stream-using-rx.
Stackoverflow, "Two-Finger Rotation Gesture on the iPhone?" (2011). Retrieved from the Internet on Sep. 28, 2011: URL:http://stackoverflow.com/questions/1303030/two-finger-rotation-gesture-on-the-iphone.
Stackoverflow, "UIImageView Gestures (Zoom, Rotate) Question," (2011). Retrieved from the Internet on Sep. 28, 2011: URL:http://stackoverflow.com/questions/3448614/uiimageview-gestures-zoom-rotate-question.
Thörnlund, "Gesture Analyzing for Multi-Touch Screen Interfaces," Bachelor's Thesis, Luleå University of Technology (2007).
UX User Experience beta, "Multitouch Gesture Interaction: Beyond the Pinches and Swipes," (2011). Retrieved from the Internet on Sep. 27, 2011: URL:http//ux.stackexchange.com/questions/5785/multitouch-gesture-interaction-beyond-the-pinches-and-swipes.
Villamore et al., "Core Gestures: Basic Gestures for Most Touch Commands," Touch Gesture Reference Guide (2010).
Wacom, "Wacom Gesture Guide: Using Touch with Wacom Tablets," (2012). Retrieved from the Internet on Aug. 31, 2012: URL:http://www.wacom.com/en/Products/Intuos/~/media/76EFCE557F7644AD889D2322DA02731C.ashx.
Ward, "History of Pen and Gesture Computing: Annotated Bibliography in On-Line Character Recognition, Pen Computing, Gesture User Interfaces and Tablet and Touch Computers," (2011). Retrieved from the Internet on Sep. 27, 2011: URL:http://users.erols.com/rwservices/pens/biblio10.html.
Westerman, "Hand Tracking, Finger Identification, and Chordic Manipulation on a Multi-Touch Surface," Spring (1999).

\* cited by examiner

DISPLACED DOUBLE TAP GESTURE

FIELD OF THE DISCLOSURE

The present disclosure relates to processing user input on a computing device and, more particularly, to processing gesture-based user input.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many devices are equipped with a touchscreen via which users provide input to various applications. A user now can manipulate objects displayed on the touchscreen using her fingers or a stylus rather a keyboard, a mouse, or another input device. Moreover, a device equipped with a so-called multi-touch interface can process user interaction with multiple points on the touchscreen at the same time. A particular input pattern including such events as, for example, a contact with the touchscreen and a certain motion of a finger or several fingers over the surface of the touchscreen typically is referred to as a gesture. A gesture can correspond to a selection of, or input to, a certain command or function. For example, a trivial gesture may be a tap on a button displayed on the touchscreen, whereas a more complex gesture may involve rotating an image or a portion of the image by placing two fingers on the touchscreen and moving the fingers along a certain path.

In general, a wide variety of software applications can receive gesture-based input. For example, such electronic devices as smart phones, car navigation systems, and handheld Global Positioning System (GPS) units can support software applications that display interactive digital maps of geographic regions. Depending on the application and/or user preferences, a digital map may illustrate topographical data, street data, urban transit information, traffic data, etc. In an interactive mode, the user may interact with the digital map using finger gestures.

SUMMARY

In one embodiment, a method for processing user input is implemented in a computing device having a motion sensor interface. The method includes detecting, via the motion sensor interface, a first tap at a first point. The method further includes detecting, via the motion sensor interface, a second tap at a second point within a fixed time interval of detecting the first tap. The method also includes processing the first tap and the second tap as an instance of a first gesture in response to determining that the second point is inside a fixed radius of the first point, or otherwise processing the first tap and the second tap as an instance of a second gesture in response to determining that the second point is outside the fixed radius of the first point.

Another embodiment of the techniques of this disclosure is a computer-readable medium storing instructions for processing input provided via a touchscreen. When executed on one or more processors, the instructions cause the one or more processors to display a digital map on the touchscreen, receive an indication of a first tap at a first point on the digital map, and receive an indication of a second tap at a second point on the digital map, such that each of the first tap and the second tap is associated with a respective touchdown and liftoff event. The instructions further cause the one or more processors, in response to determining that the second tap is detected within a fixed time interval of the first tap, to select a first map function or a second map function and apply the selected map function to the digital map. To select the first map function or the second map function, the instructions cause the one or more processors to (i) select the first map function in response to determining that the second point is within a fixed radius of the first point, and (ii) select the second map function in response to determining that the second point is outside the fixed radius of the first point.

Yet another embodiment of the techniques of this disclosure is a device including one or more processors, a motion sensor interface coupled to the one or more processors and configured to receive user input, and a memory storing a set of instructions of an extended double tap gesture processing module. When executed on the one or more processors, the double tap gesture processing module is configured to receive, from the motion sensor interface, an indication of a first tap at a first point and receive, from the motion sensor interface, an indication of a second tap at a second point. In response to determining that the indication of the second tap is received within a fixed time interval of the indication of the first tap, the double tap gesture processing module is configured to process the first tap and the second tap as an instance of one of several different double tap gestures, including select a double tap gesture based at least on a distance between the first point and the second point.

DETAILED DESCRIPTION

Figure 1:
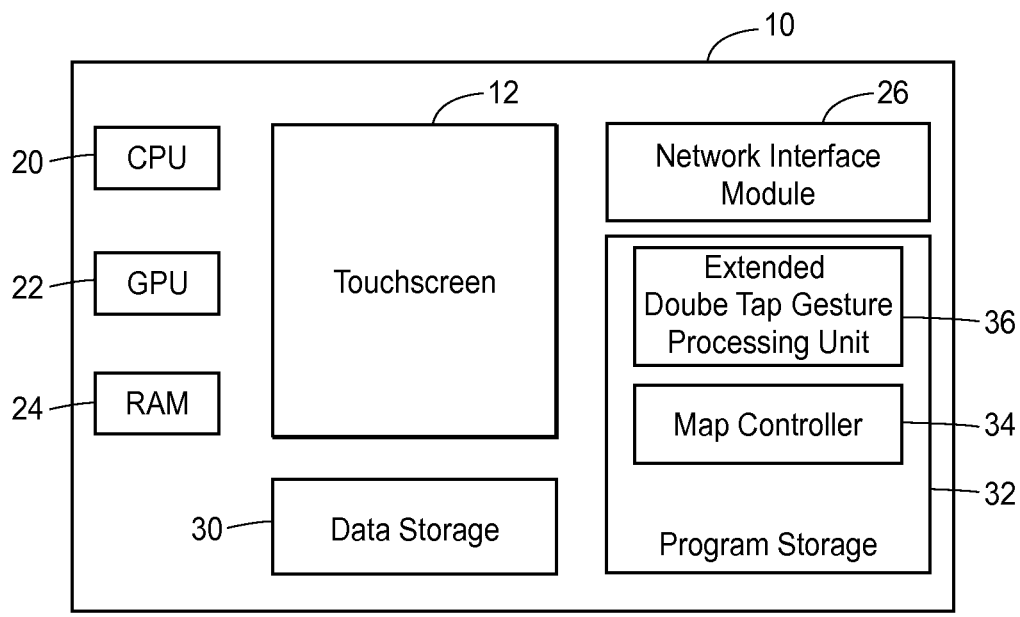
FIG. 1 is a block diagram of an example device having a touchscreen for displaying output and receiving input, in which gesture recognition and processing techniques of the present disclosure can be implemented.

Generally speaking, a software application recognizes a pair of taps on the touchscreen occurring in quick succession as a double tap gesture of one of several types, depending at least on the distance between the points of contact at which the taps occur. When the point of contact of the second tap is within a fixed radius of the point of contact of the first tap, the software application interprets the two taps as a "regular" double tap gesture which may be mapped to a certain image manipulation function, for example. However, when the point of contact of the second tap is outside this fixed radius, the software application interprets the two taps as a "displaced" double tap gesture which may be mapped to another image manipulation function. For example, the software application may zoom in on an image upon detecting a double tap gesture, and zoom out of the image upon detecting a displaced double tap gesture. In some implementations, the mapping of the displaced double tap gesture to an image manipulation function is context-specific, so that, for example, the software application zooms out of an image in one context and realigns the image with a default orientation in another context upon detecting a displaced double tap gesture.

To recognize a displaced double tap gesture, the software application additionally may determine whether the point of contact of the second tap is within a second, larger radius. According to this implementation, a pair of taps occurring at the same or approximately the same location is processed as a double tap, a pair of taps occurring at a relatively small distance from each other is processed as a displaced double tap, and a pair of taps occurring at a relatively large distance from each other is processed as two instances of a single-tap gesture, when the two taps occur within a certain fixed time interval. The second tap may be displaced in any direction (above, below, to the left, or to the right) relative to the first tap. However, if desired, the software application can interpret the direction of displacement as an additional parameter.

A touchscreen device that in which a software application can process double tap gestures of multiple types is discussed with reference to FIG. 1, a double tap gesture processing unit that can operate in such a device is discussed with reference to FIG. 2, and example techniques for processing double tap gestures of multiple types are further discussed with reference to FIGS. 3-6. For simplicity, processing double tap gestures is discussed below only in relation to software applications that provide interactive digital two- and three-dimensional maps on touchscreen devices, and the discussion below focuses on only several map manipulation functions, zoom and rotate. It will be noted, however, that the techniques of this disclosure also can be applied to other map manipulation functions such as three-dimensional tilt, for example. Further, these techniques also may be used in a variety of applications such as web browsers, image viewing and editing applications, games, social networking applications, etc. to invoke various image manipulation functions. Still further, these or similar techniques can be applied to any suitable motion sensor interface, including a three-dimensional gesture interface. In this case, the software application may process indications of contact with points on a virtual two- or three-dimensional surface, for example.

In addition to allowing users to manipulate images such as digital maps or photographs, devices can process double tap gestures of multiple types to receive other input and invoke other functions. For example, devices may apply regular and displaced double tap gestures to text (e.g., in text editing applications or web browsing applications), icons (e.g., in user interface functions of an operating system), and other displayed objects. More generally, the gesture processing techniques of the present disclosure can be used in any system configured to receive input.

Referring to FIG. 1, a device 10 in an example embodiment includes a touchscreen 12 via which a user may provide gesture input to the device 10 using fingers or a stylus. The device 10 may be a portable device such as a smartphone, a personal digital assistant (PDA), a tablet computer, a laptop computer, a handheld game console, etc., or a non-portable computing device such as a desktop computer. The device 10 includes a processor (or a set of two or more processors) such as a central processing unit (CPU) 20 that execute software instructions during operation. The device 10 also may include a graphics processing unit (GPU) 22 dedicated to rendering images to be displayed on the touchscreen 12. Further, the device 10 may include a random access memory (RAM) unit 24 for storing data and instructions during operation of the device 10. Still further, the device 10 may include a network interface module 26 for wired and/or wireless communications.

In various implementations, the network interface module 26 may include one or several antennas and an interface component for communicating on a 2G, 3G, or 4G mobile communication network. Alternatively or additionally, the network interface module 26 may include a component for operating on an IEEE 802.11 network. The network interface module 26 may support one or several communication protocols, depending on the implementation. For example, the network interface 26 may support messaging according to such communication protocols as Internet Protocol (IP), Transmission Control Protocol (TCP), User Datagram Protocol (UDP), Secure Socket Layer (SSL), Hypertext Transfer Protocol (HTTP), etc. The network interface 26 in some implementations is a component of the operating system of the device 10.

In addition to the RAM unit 24, the device 10 may include persistent memory modules such as a data storage 30 and a program storage 32 to store data and software instructions, respectively. In an example implementation, the components 30 and 32 include non-transitory, tangible computer-readable memory such as a hard disk drive or a flash chip. The program storage 32 may store a map controller 34 that executes on the CPU 20 to retrieve map data from a map server (not shown) via the network interface module 26, generate raster images of a digital map using the map data, process user commands for manipulating the digital map, etc. The map controller 34 may receive user commands from the touchscreen 12 via an extended double tap gesture processing unit 36. Similar to the map controller 34, the gesture processing unit 36 may be stored in the program storage 32 as a set of instructions executable on the CPU 20.

As an alternative, however, the device 10 may be implemented as a so-called thin client that depends on another computing device for certain computing and/or storage functions. For example, in one such implementation, the device 10 includes only volatile memory components such as the RAM 24, and the components 30 and 32 are external to the client device 10. As yet another alternative, the map controller 34 and the gesture processing unit 36 can be stored only in the RAM 24 during operation of the device 10, and not stored in the program storage 32 at all. For example, the map controller 34 and the gesture processing unit 36 can be provided to the device 10 from the Internet cloud in accordance with the Software-as-a-Service (SaaS) model. The map controller 34 and/or the multimode gesture processing unit 36 in one such implementation are provided in a browser application (not shown) executing on the device 10.

In operation, the gesture processing unit 36 processes double tap gestures of multiple types using the techniques of the present disclosure. More particularly, an operating system or another component of the device 10 may generate touchscreen events in response to the user placing his or her fingers on the touchscreen 12. The events may be generated in response to a detected change in the interaction between one or two fingers and a touchscreen (e.g., new position of a finger relative to the preceding event) or upon expiration of a certain amount of time since the reporting of the preceding event (e.g., ten milliseconds), depending on the operating system and/or configuration. Thus, touchscreen events in some embodiments of the device 10 are always different from the preceding events, while in other embodiments, consecutive touchscreen events may include identical information.

The map controller 34 during operation receives map data in a raster or non-raster (e.g., vector graphics) format, process the map data, and generates a digital map to be rendered on a touchscreen. The map controller 34 in some cases uses a graphics library such as OpenGL, for example, to efficiently generate digital maps. Graphics functions in turn may utilize the GPU 22 as well as the CPU 20. In addition to interpreting map data and generating a digital map, the map controller 34 supports map manipulation functions for changing the appearance of the digital map in response to double tap detected by the gesture processor 36. For example, the user may use gestures to select a region on the digital map, enlarge the selected region, rotate the digital map, tilt the digital map in the three-dimensional mode, etc.

Figure 2:
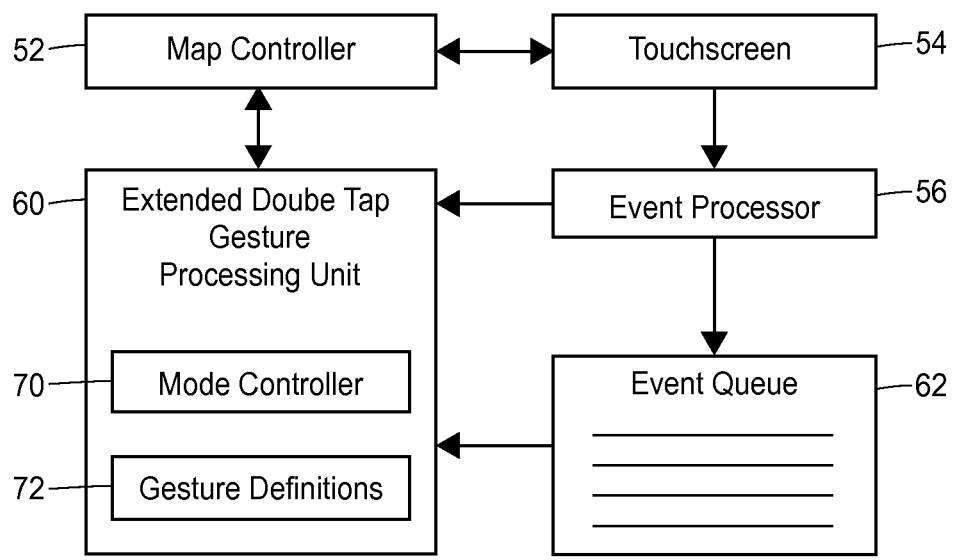
FIG. 2 is a block diagram of an example mapping system that can be implemented in the device of FIG. 1.

Next, FIG. 2 illustrates an example mapping system in which an extended double tap gesture processing unit 60 may process double tap gestures of multiple types. In addition to the gesture processing unit 60, the system of FIG. 2 includes a map controller 52, a touchscreen 54, an event processor 56, and an event queue 62. The system of FIG. 2 may be implemented in the device 10 discussed above, for example (in which case the gesture processing unit 60 may be similar to the gesture processing unit 36, the map controller 52 may be similar to the map controller 34, and the touchscreen 54 may be similar to the touchscreen 12). In one embodiment, the illustrated components of the map rendering module 50 are implemented as respective software modules operating on a suitable platform such as the Android™ operating system, for example.

The event processor 56 may be provided as a component of an operating system or as a component of an application that executes on the operating system. In an example implementation, the event processor 56 is provided as a shared library, such as a dynamic-link library (DLL), with functions for event processing that various software applications can invoke. The event processor 56 generates descriptions of touchscreen events for use by the gesture processing unit 60. Each touchscreen event may be characterized by two-dimensional coordinates of each location on the surface of the touchscreen where a contact with a finger is detected, which may be referred to as a "point of contact." By analyzing a sequence of touchscreen events, the event processor 56 may determine the trajectory of a finger (or a stylus) on the touchscreen. Depending on the implementation, when two or more fingers are on the touchscreen, a separate touchscreen event may be generated for each point of contact, or, alternatively, a single event that describes all points of contact may be generated. Further, in addition to the coordinates of one or points of contact, a touchscreen event in some computing environments also may be associated with additional information such as motion and/or transition data. If the device 10 runs the Android operating system, the event processor 56 may operate on instances of the MotionEvent class provided by the operating system.

The event processor 56 may store descriptions of touchscreen events in the event queue 62, and the gesture processing unit 60 may process these descriptions to identify gestures. In an example implementation, the number of event descriptions stored in the event queue 62 is limited to M touchscreen events. The gesture processing unit 60 may also require a minimum number L of event descriptions to trigger an analysis of the events. Thus, although the event queue 62 at some point may store more than M or less than L event descriptions, the gesture processing unit 60 may operate on N events, where $L \leq N \leq M$. Further, the gesture processing unit 60 may require that the N events belong to the same event window W of a predetermined duration (e.g., 250 ms).

With continued reference to FIG. 2, the gesture processing unit 60 includes a mode selector 70 and a gesture definitions module 72. The gesture definitions module 72 may store a definition of a gesture G in the form of set $S_G$ of start conditions $C_1, C_2, \ldots C_N$, for example, so that gesture G starts only when each of the condition in the set $S_G$ is satisfied. The number of conditions for starting a particular gesture may vary according to the complexity of the gesture. For example, a relatively complex two-finger scale gesture may include numerous conditions such as determining that the distance between two points of contact changes at or above a certain predefined rate, determining that the initial distance between the two points of contact exceeds a certain minimum value, determining that the two points of contact remain on the same line (with a certain predefined margin of error), etc. In operation, the gesture processing unit 60 may compare descriptions of individual touchscreen events or sequences of touchscreen events with these sets of start to identify gestures being performed.

For a regular double-tap gesture, the gesture definitions module 72 may store such conditions as (i) detecting contact with the touchscreen at a first point of contact, (ii) determining that the duration of the contact does not exceed maximum contact time $T_1$, (iii) detecting another contact with the touchscreen within a certain fixed time interval $T_2$ at a second point of contact, (iv) determining that the first point of contact and the second point of contact are separated by no more than a fixed radius $R_1$, and (v) determining that the duration of the second contact does not exceed maximum contact time $T_1$. For a displaced double-tap gesture, the gesture definitions module 72 may store conditions (i)-(iii) and (v) of the double-tap gesture as well as such conditions as determining that the first point of contact and the second point of contact are separated by least a fixed radius $R_1$ and, optionally, determining that the first point of contact and the second point of contact are separated by no more than a fixed radius $R_2$, where $R_2 > R_1$.

The mode selector 70 may associate the extended double gesture, as well as other gestures, with different map manipulation functions in different command contexts. The mapping may be user-configurable. According to an example implementation, the mode selector 70 and/or the map controller 52 maps the regular double tap gesture to a zoom-in function for increasing the zoom level by a predetermined amount and the extended double tap gesture to a zoom-out function for decreasing the zoom level by the same amount, in the default mode of displaying a digital map on the touchscreen 54. If, however, the user rotates the digital map so that the top of the touchscreen 54 is no longer aligned with the default direction (e.g., North), the mode selector 70 maps the displaced double tap gesture to an orientation alignment function for rotating the digital map until the digital map has the default orientation. In operation, the map controller 52 receives an indication of a displaced double tap gesture, determines whether the digital map has the default orientation and, if so, invokes the zoom-out function. Otherwise, if the digital map does not have the default orientation, the map controller 52 rotates the digital map to achieve the default orientation. In this manner, the mode selector 70 and/or the map controller 52 can prioritize the map manipulation functions mapped to a displaced double tap gestures in various command contexts.

Figure 3:
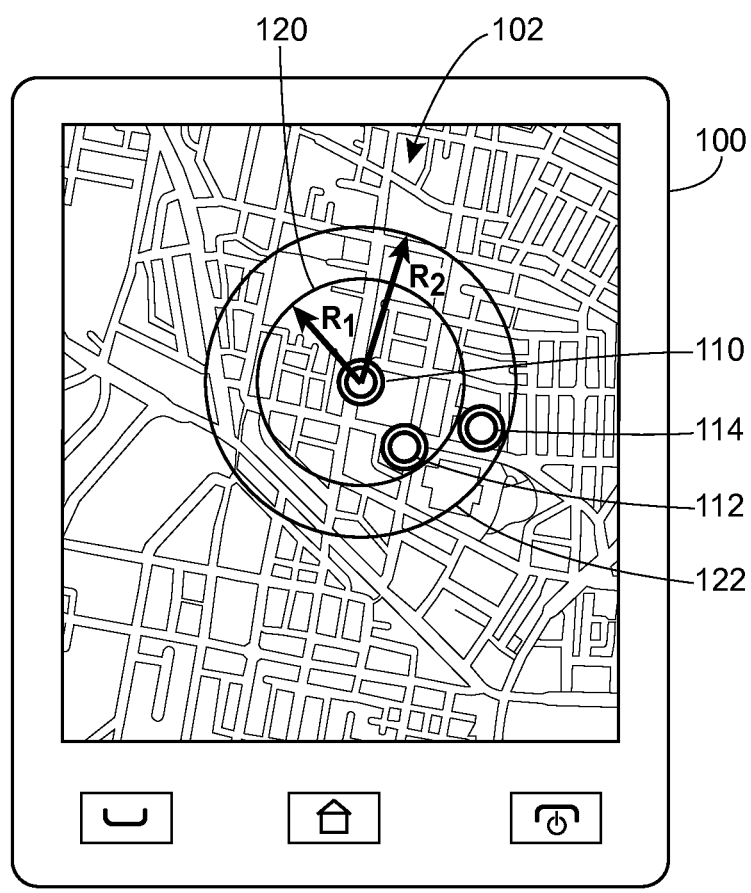
FIG. 3 is a diagram of a double tap gesture and a displaced double tap gesture which the extended double tap gesture processing unit of FIG. 2 can process.

Next, FIG. 3 illustrates processing a double tap gesture and a displaced double tap gesture on an example touchscreen device 100, which may be similar to the device 10 discussed above with reference to FIG. 1. To display and modify a digital map 102 according to user gestures, the device 100 may implement a mapping module or system similar to the mapping system of FIG. 2.

When a user taps on the touchscreen at a point of contact 110, the device 100 processes the subsequent tap as a part of a double tap gesture or an extended double tap gesture, provided the timing requirements are satisfied. If the second tap occurs at a point of contact 112, which is within a circle 120 with fixed radius $R_1$, the device 100 processes the two taps as a double tap gesture. If the second tap occurs at a point of contact 114, which is within a circle 122 with fixed radius $R_2$ but outside the circle 120, the device 100 recognizes a displaced double tap gesture. In another implementation, the device 100 does not check whether the point of contact 114 is within the circle 122.

Figure 4:
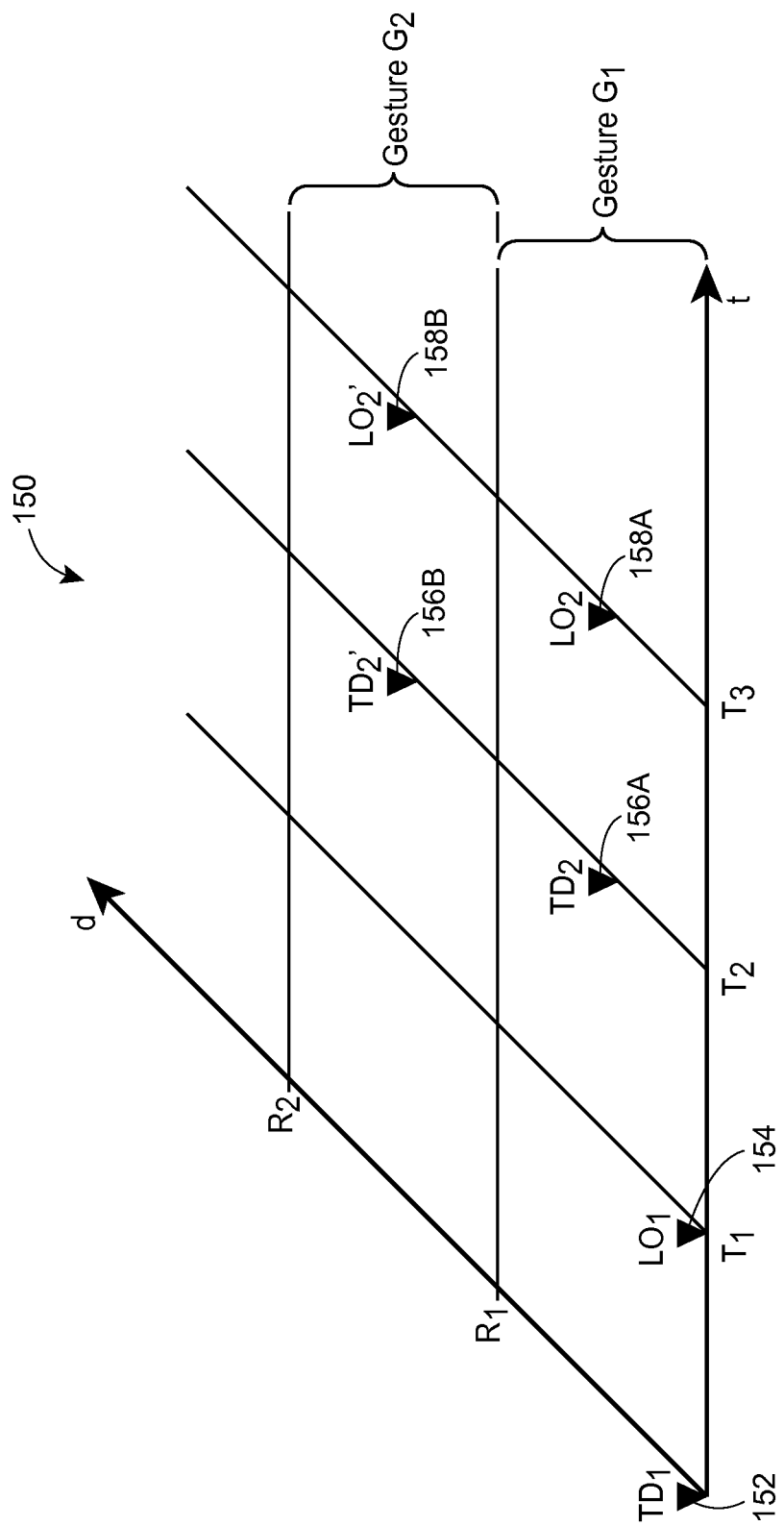
FIG. 4 is a timing diagram that illustrates processing an example sequence of events to recognize a double tap gesture or an extended double tap gesture, which the extended double tap gesture processing unit of FIG. 2 can implement.

For further clarity, a timing diagram 150 in FIG. 4 illustrates processing an example sequence of events to recognize a double tap gesture or an extended double tap gesture. This event processing may be implemented in the extended double tap gesture processing unit 60, for example.

According to the timing diagram 150, finger touchdown event $TD_1$ (event 152) occurs at a time selected to be the beginning of the timeline of FIG. 4. The event 152 occurs at a location on the touchscreen relative to which subsequent finger touchdown events are measured. Finger liftoff event $LO_1$ (event 154) occurs at time $t_1 \leq T_1$ following the event 152. Accordingly, the gesture processing unit 60 can interpret the events 152 and 154 as a possible instance of a (single) tap gesture. More specifically, the gesture processing unit 60 can forward an indication of a tap gesture to the map controller 52 if no finger touchdown events occur after the event 154 within time period $T_2$. However, if the gesture processing unit 60 detects another finger touchdown event within this time period, the gesture processing unit 60 can decide to not forward an indication of a tap gesture to the map controller 52 until it is determined whether the second tap is a part of a regular or displaced double tap gesture.

As illustrated in FIG. 4, finger touchdown event $TD_2$ (event 156A) may be detected at time $t_2 \leq T_2$ following the event 154 at a distance $d_1 \leq R_1$ from the location on the touchscreen at which the finger touchdown event was detected. Alternatively, finger touchdown event $TD'_2$ (event 156B) may be detected at time $t_2 \leq T_2$ following the event 154 at a distance $R_1 < d_2 \leq R_2$ from the location on the touchscreen at which the finger touchdown event was detected. The corresponding liftoff event $LO_2$ (event 158A) or $LO'_2$ (event 158B) occurs at time $t_3 \leq T_3$ following the event 156A or 156B. After detecting the event 158A or 158B, the gesture processing unit 60 may forward an indication of a double tap gesture or a displaced double tap gesture, respectively, to the map controller 52.

Figure 5:
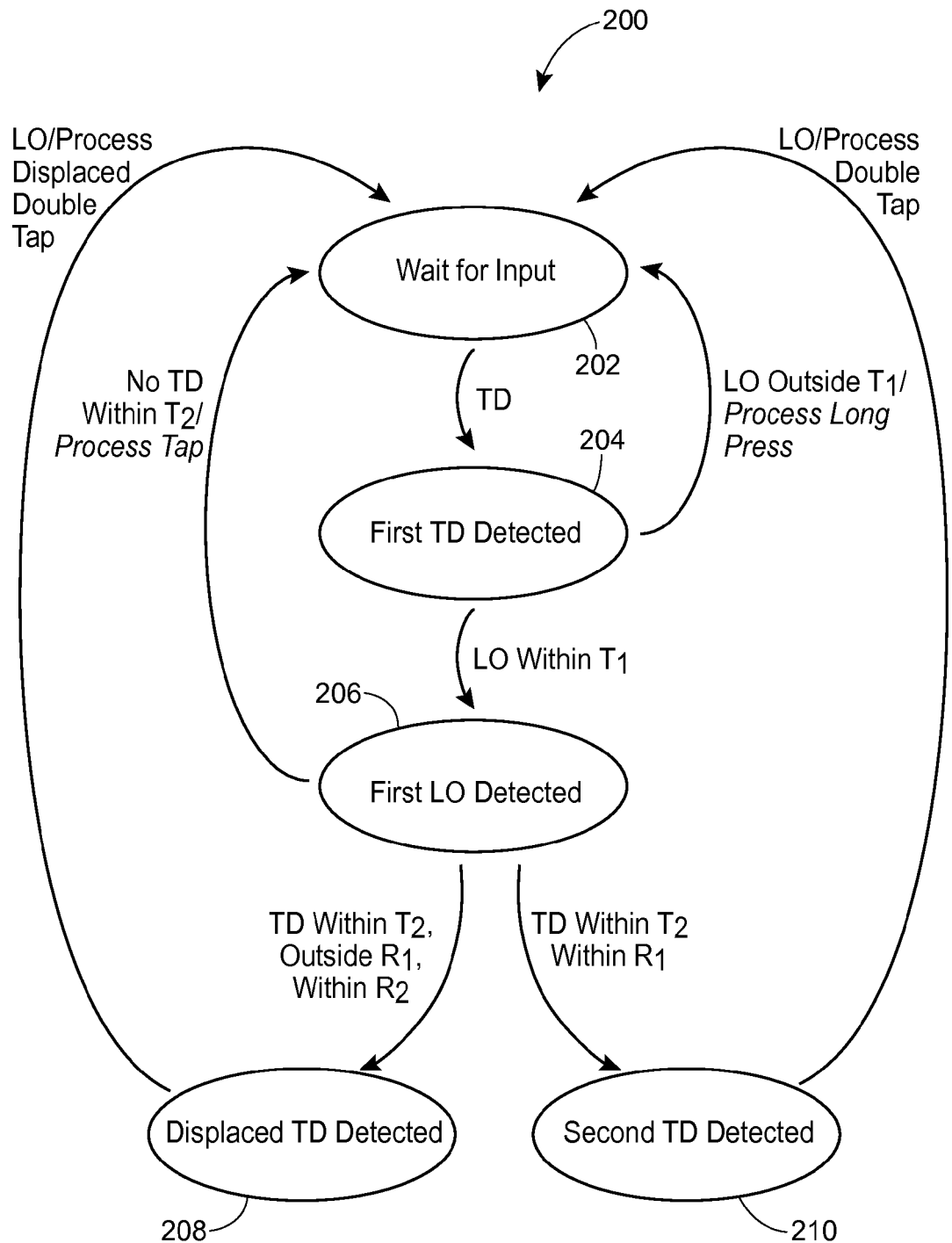
FIG. 5 is a state transition diagram of an example technique for processing double tap gestures of multiple types, which the extended double tap gesture processing unit of FIG. 2 can implement.

Now referring to FIG. 5, a state transition diagram 200 of an example technique for processing double tap gestures of multiple types can be implemented in the extended double tap gesture processing unit 60 and/or the map controller 52, for example. In FIG. 5, states are illustrated in respective bubbles, state transitions are illustrated using arrows, events that trigger state transitions are listed next to the corresponding arrows, and actions performed at state transitions are listed next to the arrows in italics.

In state 202, the gesture processing unit 60 awaits user input. In response to receiving a finger touchdown event, the gesture processing unit 60 advances to state 204 to await a liftoff event. If the liftoff event occurs within time interval $T_1$, the gesture processing unit 60 advances to state 206. Otherwise, if the liftoff event occurs outside the time interval $T_1$, the gesture processing unit 60 returns to state 202 and processes a long press event.

From state 206, the gesture processing unit 60 can advance to state 208, advance to state 210, or return to state 202. More particularly, if a touchdown event is detected within time interval $T_2$ at a location that is within radius $R_1$ of the location of the first touchdown event, state 210 is selected; if a touchdown event is detected within time interval $T_2$ at a location that is within radius $R_2$ but outside radius $R_1$ of the location of the first touchdown event, state 208 is selected; and if no touchdown event is detected within time interval $T_2$, state 202 is selected and a single tap gesture is processed.

In each of states 208 and 210, the gesture processing unit 60 awaits a finger liftoff event. When a liftoff event occurs in state 210, the gesture processing unit 60 returns to state 202 and processes a double tap gesture. When a liftoff event occurs in state 208, the gesture processing unit 60 returns to state 202 and processes a displaced double tap gesture. For example, a zoom-in function may be invoked in response to the double tap gesture, and a zoom-out function may be invoked in response to the displaced double tap gesture.

Figure 6:
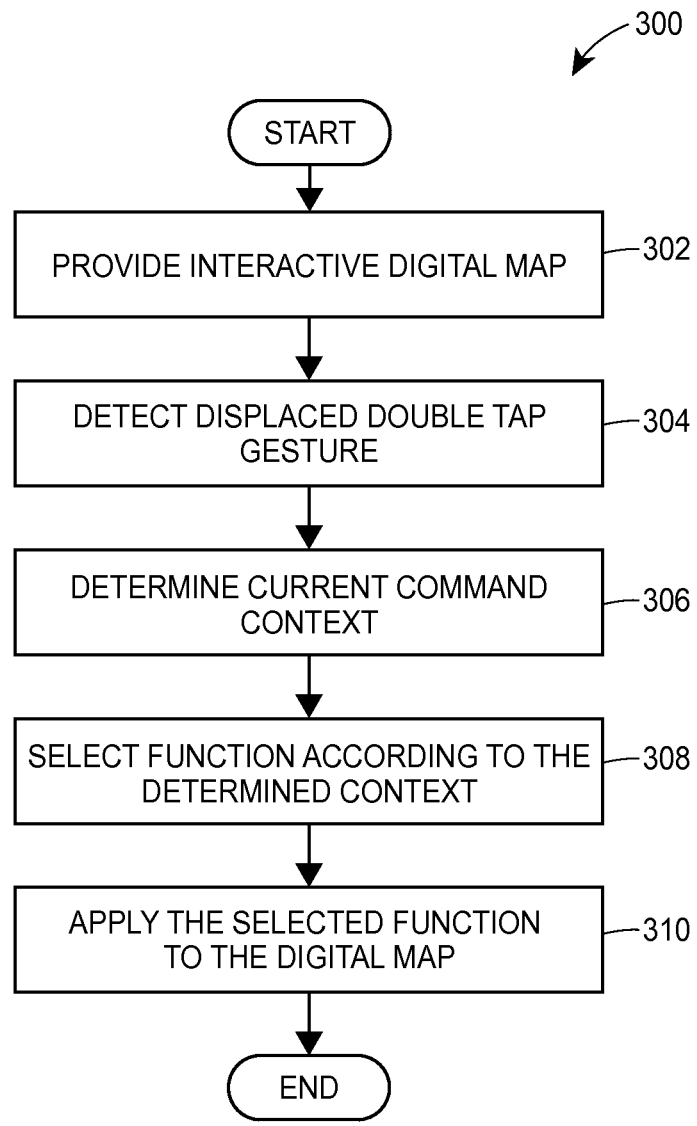
FIG. 6 is a flow diagram of an example method for processing a displaced double tap gesture according to the current command context.

As indicated above, the gesture processing unit 60 may process the displaced double tap gesture differently in different situations. FIG. 6 illustrates a flow diagram 300 of an example method for processing a displaced double tap gesture according to the current command context. At block 302, an interactive digital map is provided on a touchscreen or another suitable display device. A displaced double tap gesture is detected block 304 using, for example, the techniques discussed above and illustrated in FIGS. 3-5.

Current command context is determined at block 306 based on the previously entered commands and/or the current state of the digital map. For example, the command context may indicate that the digital map is not oriented with North being aligned with the top of the touchscreen, that the zoom level at which the digital map is being displayed is different than the default zoom level, etc. A function is selected according to the determined command context at block 308. The selected function is then applied at block 310.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for processing double tap gestures through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for processing user input on a computing device having a motion sensor interface, the method comprising:
    displaying an initial image corresponding to an initial view of a digital geographical map on the computing device, wherein the digital geographical map is displayed at a selected zoom level in the initial view;
    detecting, via the motion sensor interface, a first tap at a first point, the first tap including a first touchdown event at the first point and a first liftoff event at the first point;
    detecting, via the motion sensor interface, a second tap at a second point within a fixed time interval of detecting the first tap, the second tap including a second touchdown event at the second point and a second liftoff event at the second point;
    based at least on the first tap, the second tap, and a fixed radius value, selecting one of a first image manipulation function that includes one of increasing or decreasing the selected zoom level by a predetermined amount to transforms the initial view of the digital geographical map to a first modified view of the digital geographical map and a second image manipulation function that includes the other one of increasing or decreasing the selected zoom level by the predetermined amount to transforms the initial view of the digital geographical map to a second modified view of the digital geographical map, including:
    determining whether the second point is inside the fixed radius value of the first point,
    in response to determining that the second point is inside the fixed radius value of the first point, processing the first tap and the second tap as an instance of a first double tap gesture to invoke the first image manipulation function; otherwise, in response to determining that the second point is outside the fixed radius value of the first point, processing the first tap and the second tap as an instance of a second double tap gesture to invoke the second image manipulation function.

2. The method of claim 1, wherein the fixed radius value is a first fixed radius value; the method further comprising determining that the second point is within a second fixed radius value of the first point.

3. The method of claim 1, wherein a pair of taps detected outside the fixed time interval is interpreted as two separate instances of a third gesture.

4. The method of claim 1, wherein applying an instance of the first double tap gesture or the second double tap gesture to the digital geographical map includes providing the first point as a parameter to a respective map manipulation function.

5. The method of claim 1, wherein applying an instance of the second double tap gesture to the digital geographical map includes:
    determining a command context defined by interaction with the digital geographical map prior to detecting the first tap, and
    selecting a map manipulation function according to the determined command context.

6. The method of claim 1, wherein the motion sensor interface is a touchscreen, and wherein the first point and the second point are on a surface of the touchscreen.

7. The method of claim 1, wherein:
    detecting the first tap includes detecting the first touchdown event and the first liftoff event within a fixed liftoff interval of the first touchdown event, and
    detecting the second tap includes detecting the second touchdown event and the second liftoff event within the fixed liftoff interval of the second touchdown event.

8. A non-transitory computer-readable medium storing thereon a plurality of instructions for processing input provided via a touchscreen, wherein the plurality of instructions, when executed on one or more processors, causes the one or more processors to:
    cause an initial view of a digital geographical map to be displayed on the touchscreen, wherein the digital geographical map is displayed at a selected zoom level in the initial view;
    receive an indication of a first tap at a first point on the digital geographical map;

receive an indication of a second tap at a second point on the digital geographical map, wherein each of the first tap and the second tap is associated with a respective touchdown and liftoff event at the first point and the second point, respectively;

based at least on the first tap, the second tap, a fixed time interval of the first tap, and a fixed radius value, select one of a first map function that includes one of increasing or decreasing the selected zoom level to transforms the initial view of the digital geographical map to a first modified view of the digital geographical map and a second map function that includes the other one of increasing or decreasing the selected zoom level to transforms the initial view of the digital geographical map to a second modified view of the digital geographical map, including:

in response to determining that the second tap is detected within the fixed time interval of the first tap, select one of the first map function or the second map function, including (i) select the first map function in response to determining that the second point is within the fixed radius value, and (ii) select the second map function in response to determining that the second point is outside the fixed radius value; and apply the selected one of the first map function and the second map function to the digital geographical map to transform the digital geographical map from the initial view to one of a first modified view or a second modified view, respectively.

9. The computer-readable medium of claim 8, wherein increasing or decreasing the selected zoom level is associated with a same discrete change in zoom level.

10. A device comprising:
one or more processors;
a motion sensor interface coupled to the one or more processors and configured to receive user input;
a memory coupled to the one or more processors storing therein a set of instructions of an extended double tap gesture processing module which, when executed on the one or more processors, is configured to:
displaying an initial image corresponding to an initial view of a digital geographical map;
receive, from the motion sensor interface, an indication of a first tap, including a first touchdown event and a first liftoff event, at a first point,
receive, from the motion sensor interface, an indication of a second tap, including a second touchdown event and a second liftoff event, at a second point,
based at least on the first tap, the second tap, a fixed time interval of the indication of the first tap, and a fixed radius value, selecting one of a first image manipulation function that transforms the initial view of the digital geographical map to a first modified view of the digital geographical map and a second image manipulation function that transforms the initial view of the digital geographical map to a second modified view of the digital geographical map by rotating the digital geographical map to align the digital geographical map with a default orientation, including:
in response to determining that the indication of the second tap is received within the fixed time interval of the indication of the first tap, process the first tap and the second tap as an instance of one of a plurality of double tap gestures, including selecting one of the plurality of double tap gestures based at least on the fixed radius value,
wherein selecting a first one of the plurality of double tap gestures includes invoking the first image manipulation function in response to determining that the second point is within the fixed radius value, and selecting a second one of the plurality of double tap gestures includes invoking the second image manipulation function in response to determining that the second point is outside the fixed radius value.

11. The device of claim 10, wherein the motion sensor interface includes a touchscreen, and wherein the first point and the second point are on a surface of the touchscreen.

12. The device of claim 10, wherein the memory further stores instructions of a map controller configured to (i) render the digital geographical map using map data, (ii) receive an indication of the selected one of the plurality of double tap gestures from the extended double tap gesture processing module, and (iii) apply the selected one of the plurality of double tap gestures to the digital geographical map.

13. The device of claim 12, wherein the plurality of double tap gestures includes a regular double tap gesture selected when the distance between the first point and the second point is within the first radius value, and a displaced double tap gesture selected when the distance between the first point and the second point is outside the first radius value but within a second radius value.

14. The method of claim 1, wherein:
detecting the first tap and the second tap includes receiving respective events from an operating system, at an application executing on the operating system, and
processing the first tap and the second tap is implemented in the application.

15. The method of claim 1, further comprising implementing a state machine to process the first tap and the second tap as an instance of the first gesture or the second gesture,
including:
awaiting the first tap in an initial state, and
returning to the initial state after processing the first tap and the second tap as an instance of the first gesture or the second gesture.

16. The method of claim 15, further including:
upon the second touchdown event, advancing to a state in which the first gesture is detected after determining that the second point is inside the fixed radius value of the first point,
upon the second touchdown event, advancing to a state in which the second gesture is detected after determining that the second point is inside the fixed radius value of the first point, and
returning to the initial state upon the second liftoff event.

17. The method of claim 1, wherein processing the first tap and the second tap as the instance of the second gesture includes interpreting a direction of displacement of the second tap relative to the first tap.

* * * * *